United States Patent [19]
Tamura et al.

[11] 3,772,852
[45] Nov. 20, 1973

[54] PROCESS FOR THE SEPARATION OR CONCENTRATION OF GASEOUS MIXTURE

[76] Inventors: Takaaki Tamura, 6-814, Toyama-Heights, 1, Toyama-cho; Hideo Minato, 57-7, 4-chome, Denenchofu; Toshimasa Ishiko, 6, 3-chome, Fukazawa, all of Tokyo; Yoshio Shindou, 250, 2-chome, Tobe-machi, Yokohama, all of Japan

[22] Filed: June 16, 1970

[21] Appl. No.: 46,839

Related U.S. Application Data

[63] Continuation-in-part of Ser. No. 606,582, Jan. 3, 1967, abandoned.

[52] U.S. Cl. .............................. 55/32, 55/68, 55/70, 55/75
[51] Int. Cl. ............................................. B01d 51/02
[58] Field of Search ...................... 55/32, 68, 75, 70

[56] References Cited
UNITED STATES PATENTS

| | | |
|---|---|---|
| 3,473,296 | 10/1969 | Tamura.............................. 55/75 X |
| 2,882,243 | 4/1959 | Milton ............................... 55/75 X |
| 3,012,853 | 12/1961 | Milton ............................... 55/75 X |
| 3,130,007 | 4/1964 | Breck................................. 55/75 X |
| 2,988,503 | 6/1961 | Milton et al. ...................... 55/75 X |
| 2,882,244 | 4/1959 | Milton ............................... 55/75 X |

*Primary Examiner*—John Adee
*Attorney*—Wenderoth, Lind and Ponack

[57] ABSTRACT

The present invention provides a process for selectively separating or concentrating a specific gas or gases from a gas mixture by contacting said mixture at a room temperature under a normal pressure with an adsorbent prepared by activating at a temperature of about 350° to 700°C. a rock or mineral having the chemical composition mainly consisting of $SiO_2$, $Al_2O_3$ and $H_2O$ and containing 1 to 10 percent by weight of the total of $K_2O$, $Na_2O$ and $CaO$ and also having the X-ray diffraction image shown in Table A or Table B of the specification.

3 Claims, No Drawings

PROCESS FOR THE SEPARATION OR CONCENTRATION OF GASEOUS MIXTURE

This is a continuation-in-part application of U.S. Pat. application Ser. No. 606,582, filed Jan. 3, 1967 now abandoned.

The present invention relates to a process for selectively separating or concentrating a specific gas or gases from or in a gaseous mixture utilizing an adsorbent.

As a process for separating a gas or gases from a gaseous mixture with an adsorbent, there are usually employed (1) a method in which the difference in adsorption power of an adsorbent caused by a difference in temperature is utilized and (2) a method in which the difference in adsorption power of an adsorbent caused by a difference in pressure is utilized. That is, in the former a specific gas is adsorbed on an adsorbent at a lower temperature and the gas is desorbed from the adsorbent at a high temperature, and in the latter a specific gas is adsorbed on an adsorbent at a high pressure and desorbed therefrom at a low pressure.

As one of the adsorbents used in such a method, a zeolitic molecular sieve has recently been proposed. The zeolitic molecular sieve has been used for the selective separation of two or more gases from each other having largely different molecular diameters but has never been used for the separation of two or more gases having the same or slightly different molecular diameters.

In accordance with the present invention, the gas separation or the gas concentration is conducted by utilizing the difference in adsorption power of a specific adsorbent caused by a difference in temperature or the difference in pressure.

Therefore, an object of the present invention is to provide a process for adsorbing a gaseous mixture consisting of gases having the same or very similar molecular diameters, such as CO, $CO_2$, $N_2$ and $O_2$ at a room temperature and a normal pressure.

Another object of the invention is to provide an adsorbent having an excellent selective adsorption power at a normal temperature particularly for $N_2$ and CO.

Still another object of this invention is to provide an adsorbent having a very high strength and which can be prepared very simply and economically.

Other objects and advantages of the present invention will become clear from the following descriptions and the claims.

The present invention is concerned with a process for selectively separating or concentrating a specific gas or gases from or in a gas mixture using an adsorbent prepared by dehydrating by heating for the activation thereof at about 350° to 700°C. a rock or mineral having the chemical composition mainly consisting of $SiO_2$, $Al_2O_3$ and $H_2O$ and containing 1 to 10 percent by weight of the total amount of $K_2O$, $Na_2O$ and CaO and also having the X-ray diffraction image shown in following Table A or Table B.

| Table A A | 10 I/Io | Table B A | 10 I/Io |
|---|---|---|---|
| 13.9 ± 0.1 | 2 | 9.10 ± 0.1 | 7 |
| 9.1 ± 0.1 | 4 | 7.99 ± 0.1 | 4 |
| 6.6 ± 0.1 | 4 | 6.82 ± 0.1 | 2 |
| 6.5 ± 0.1 | 2 | 5.85 ± 0.08 | 5 |
| 6.1 ± 0.1 | 2 | 5.29 ± 0.08 | 2 |
| 5.83 ± 0.05 | 2 | 5.12 ± 0.05 | 3 |
| 4.55 ± 0.05 | 4 | 4.67 ± 0.05 | 2 |
| 4.30 ± 0.10 | 0–5 | 4.30 ± 0.10 | 0–5 |
| 4.26 ± 0.10 | 0–2 | 4.26 ± 0.10 | 0–2 |
| 4.08 ± 0.10 | 0–4 | 4.08 ± 0.10 | 0–4 |
| 4.05 ± 0.10 | 0–6 | 4.05 ± 0.10 | 0–6 |
| 4.01 ± 0.05 | 7 | 3.98 ± 0.05 | 10 |
| 3.85 ± 0.03 | 2 | 3.85 ± 0.05 | 2 |
| 3.81 ± 0.10 | 0–4 | 3.81 ± 0.01 | 0–4 |
| 3.77 ± 0.05 | 1 | 3.77 ± 0.05 | 2 |
| 3.48 ± 0.03 | 10 | 3.47 ± 0.03 | 7 |
| 3.40 ± 0.03 | 5 | 3.36 ± 0.10 | 0–8 |
| 3.35 ± 0.10 | 0–8 | 3.35 ± 0.03 | 5 |
| 3.23 ± 0.03 | 6 | 3.22 ± 0.03 | 4 |
| 3.10 ± 0.03 | 0–1 | 3.18 ± 0.03 | 4 |
| 2.90 ± 0.03 | 3 | 3.15 ± 0.03 | 4 |
| 2.85 ± 0.03 | 0–2 | 2.99 ± 0.03 | 0–1 |
| 2.71 ± 0.03 | 1 | 2.98 ± 0.03 | 4 |
| 2.58 ± 0.03 | 1 | 2.89 ± 0.03 | 4 |
| 2.53 ± 0.03 | 2 | 2.85 ± 0.03 | 0–2 |
| 2.49 ± 0 03 | 0–4 | 2.81 ± 0.03 | 3 |
| 2.47 ± 0.03 | 0–3 | 2.74 ± 0.03 | 1 |
| 2.45 ± 0.03 | 0–2 | 2.53 ± 0.02 | 2 |
| 2.04 ± 0.03 | 2 | 2.49 ± 0.03 | 0–4 |
| 1.96 ± 0.03 | 1 | 2.47 ± 0.03 | 0–3 |
| 1.88 ± 0.02 | 1 | 2.46 ± 0.02 | 2 |
| 1.82 ± 0.02 | 1 | 2.45 ± 0.03 | 0–2 |
| 1.81 ± 0.02 | 0–2 | 2.02 ± 0.02 | 0.5 |
| 1.79 ± 0.02 | 1 | 1.95 ± 0.02 | 0.05 |
| 1.53 ± 0.02 | 1 | 1.87 ± 0.02 | 0.5 |
| | | 1.81 ± 0.02 | 0–2 |
| | | 1.72 ± 0.02 | 0.5 |

In the specification, the inorganic material showing the X-ray diffraction image in Table A is called "material A" and the inorganic material showing the X-ray diffraction image in Table B is called "material B", and further, the adsorbent obtained from material A is called "adsorbent A" and the adsorbent obtained from material B is called "adsorbent B" for the sake of convenience.

In addition, there may be some deviations in the values of specific intensity 10 I/Io and the position of the X-ray diffraction image (A) shown in Table A or Table B due to the influence of the apparatus used, the temperature, and humidity and the manner of packing the crystal powders but such deviations are not substantial for the definition of the inorganic material of this invention.

Material A is mainly distributed in the Tohoku district and Chugoku district in Japan while material B is mainly distributed in Tohoku district and the Kyushu district, and they can be divided into a class having a larger grain size and a class having a smaller grain size of less than 50 microns. The material having a larger grain size occurs in a dispersed distribution i.e. only a small amount of several grams in one area in the state of a mineral of lustrous beautiful thread-like crystal in the case of material A and plate crystal in the case of material B. On the other hand, the material having a smaller crystal grain occurs in one area in the state of a rock in an amount of about several hundred tons. The material used in this invention in the industrial practice is, therefore, the latter one occurring in the state of a rock having a smaller crystal grain and being available economically in a large amount.

In the specification these rocks are called "rock A" and "rock B" and they are synthetically called simply "specific rock" or "rock".

In order to prepare the adsorbent of this invention, the specific rock is ground into a suitable grain size, e.g., of about 10 to 50 mesh and subjected to dehydrating treatment by heating. In this case, the order of grinding and heating for dehydration may be selected suitably, but for achieving a sufficiently thorough dehydration by heating, it is better to conduct the grinding first.

The dehydrating treatment aims at the removal of the attached or adsorbed water on the specific rock and the water of crystalization thereof and the most preferable result is obtained by heating in a temperature range of about 350° to 700°C. in particular about 400° to 650°C.

When the heating temperature is lower than 350°C., the adsorption power of the thus activated rock is extremely low and it cannot be practically used purpose. Furthermore, when the rock is heated to a temperature higher than 700°C., the structure of the rock is changed by the heat, and hence the practical value of the rock is reduced. Thus, while the temperature for dehydration heating of a so-called synthetic zeolite is lower than 350°C., the activation temperature of the specific rock of this invention is higher than 350°C., which is one of the features of the present invention.

Although the heating period for dehydrating the specific rock is influenced by the grain size of the thus ground rock and the heating manner, it is usually from about 1 hour to 3 hours conventional heating systems may be employed, it being unnecessary to rapidly heat or gradually heat the rock. Of course, the activation may be conducted at a reduced pressure and in such a case the heating temperature may be reduced.

Now, with regard to the adsorbents made of rocks A and B of the present invention themselves it is to note that they are novel and unobvious over the prior art. As for conventional adsorbents made from zeolites there are known various kinds of natural and synthetic crystalline zeolites such as chabazite, natrolite, mesolite and the like and synthetic crystalline zeolites such as zeolite 4A, zeolite 5A, zeolite 10X, zeolite 13X, zeolite $Na_2X$, zeolite CaX, $Li_2X$ and the like.

However, the adsorbent made of rocks A and B of the present invention is materials quite different from natural and synthetic crystalline zeolites as above-mentioned.

In the following zeolite X of U.S. Pat. No. 2,882,244 to Milton shall be referred to for the comparison.

i. First difference resides in the chemical composition.

For the rocks A is given a general form of $0.37 \pm 0.31$ ($K_2O$, $Na_2O$), $0.54 \pm 0.22$ (CaO, MgO), $1.0 \pm 0.20$ ($Al_2O_3$), $8.75 \pm 0.25$ ($SiO_2$), $6.82 \pm 0.90$ ($H_2O$)

and for the rocks B $0.95 \pm 0.08$ ($K_2O$, $Na_2O$), $0.6 \pm 0.1$ (CaO, MgO), $1.0 \pm 0.2$ ($Al_2O_3$), $10 \pm 3$ ($SiO_2$), $6 - 8$ ($H_2O$).

On the other hand, a synthetic zeolite X of Milton has a general form of $0.9 \pm 0.2$ ($M_2O/n$) : $Al_2O_3$ : $2.5 \pm 0.5$ $SiO_2$ : Y $H_2O$ From the above comparison of the above-mentioned formulae it is evident that the rocks of the present invention are distinguished from the zeolite X of the reference by a high content of $SiO_2$.

ii. Second difference relates to that in the X-ray powder patterns between adsorbents of both categories.

When comparing the X-ray patterns of adsorbents A and B of the present invention with those of zeolites X of the reference, particularly CaX and $Na_2X$ as typical examples of the reference, while arranging them in order of magnitude of the position of X-ray diffraction image (A), as are shown in Table C, it is evidently seen that there are found no cases in common between adsorbents of both categories. For instance, the maximum A for $Na_2X$ zeolite of the reference shows 14.47 A at the specific intensity of (100 I/Io), but there are found no corresponding cases for the adsorbents A and B of the present invention. Likewise the maximum A for CaX zeolite of the reference shows 14.37 at 100 I/Io. But, there are found also no corresponding cases for the adsorbents of the present invention.

On the other hand, the maximum specific intensity for the adsorbent B of the present invention is 10 at $3.98 \pm 0.05$ A and that for the adsorbent A is 10 at $3.48 \pm 0.03$ A, but there are found no corresponding cases for the adsorbents of the reference in both cases.

Judging from a synthetic observation of the position of X-ray diffraction pattern (A) and specific intensity (I/Io) there is found no commonness between the adsorbents of the present invention and those of the reference, which designates most evidently that the adsorbents of the present invention are materials quite different from those of the reference.

TABLE C.—COMPARISON OF X-RAY POWDER PATTERNS OF ADSORBENT A AND B OF THE PRESENT INVENTION WITH CaX AND $Na_2X$ OF THE REFERENCE

| Present invention | | | | U.S. Patent 2,882,244 | | | |
|---|---|---|---|---|---|---|---|
| Adsorbent A | | Adsorbent B | | CaX | | $Na_2X$ | |
| d(A.) | 10 I/Io | d(A.) | 10 I/Io | d(A.) | 100 I/Io | d(A.) | 100 I/Io |
|  |  |  |  |  |  | 14.47 | 100 |
|  |  |  |  | 14.37 | 100 |  |  |
| 13.9±0.1 | 2 |  |  |  |  |  |  |
| 9.1±0.1 | 4 | 9.10±0.1 | 7 |  |  |  |  |
|  |  |  |  |  |  | 8.85 | 18 |
|  |  |  |  | 8.79 | 9 |  |  |
|  |  | 7.99±0.1 | 4 |  |  |  |  |
|  |  |  |  |  |  | 7.54 | 12 |
|  |  |  |  | 7.51 | 4 |  |  |
|  |  | 6.82±0.1 | 2 |  |  |  |  |
| 6.5±0.1 | 4 |  |  |  |  |  |  |
| 6.5±0.1 | 2 |  |  |  |  |  |  |
| 6.1±0.1 | 2 |  |  |  |  |  |  |
|  |  | 5.85±0.08 | 5 |  |  |  |  |
|  |  | 5.83±0.05 | 2 |  |  |  |  |
|  |  |  |  |  |  | 5.73 | 18 |
|  |  |  |  | 5.71 | 16 |  |  |
|  |  | 5.29±0.08 | 2 |  |  |  |  |
|  |  | 5.12±0.05 | 3 |  |  |  |  |
|  |  |  |  |  |  | 4.81 | 5 |
|  |  |  |  | 4.79 | 5 |  |  |
|  |  | 4.67±0.05 | 2 |  |  |  |  |
| 4.55±0.05 | 4 |  |  |  |  |  |  |
|  |  |  |  |  |  | 4.42 | 9 |
|  |  |  |  | 4.40 | 11 |  |  |
| 4.30±0.10 | 0-5 | 4.30±0.10 | 0-5 |  |  |  |  |
| 4.26±0.10 | 0-2 | 4.26±0.10 | 0-2 |  |  |  |  |
|  |  |  |  |  |  | 4.23 | 1 |
| 4.08±0.10 | 0-4 | 4.08±0.10 | 0-4 |  |  |  |  |
| 4.05±0.10 | 0-6 | 4.05±0.10 | 0-6 |  |  |  |  |
| 4.01±0.05 | 7 |  |  |  |  |  |  |

TABLE C.—COMPARISON OF X-RAY POWDER PATTERNS OF ADSORBENT A AND B OF THE PRESENT INVENTION WITH CaX AND Na$_2$X OF THE REFERENCE

| Present invention | | | | U.S. Patent 2,882,244 | | | |
|---|---|---|---|---|---|---|---|
| Adsorbent A | | Adsorbent B | | CaX | | Na$_2$X | |
| d(A.) | 10 I/I$_0$ | d(A.) | 10 I/I$_0$ | d(A.) | 100 I/I$_0$ | d(A.) | 100 I/I$_0$ |
|  |  | 3.98±0.05 | 10 |  |  |  |  |
|  |  |  |  |  |  | 3.946 | 4 |
| 3.85±0.03 | 2 |  |  |  |  |  |  |
| 3.81±0.10 | 0–4 | 3.81±0.10 | 0–4 |  |  |  |  |
|  |  |  |  | 3.936 | 2 |  |  |
|  |  |  |  |  |  | 3.808 | 21 |
| 3.77±0.05 | 1 | 3.77±0.05 | 2 |  |  |  |  |
|  |  |  |  |  |  | 3.765 | 3 |
|  |  |  |  | 3.754 | 2 |  |  |
|  |  |  |  |  |  | 3.600 | 1 |
|  |  |  |  | 3.593 | 2 |  |  |
|  |  |  |  |  |  | 3.500 | 1 |
|  |  |  |  | 3.486 | 2 |  |  |
| 3.48±0.03 | 10 |  |  |  |  |  |  |
|  |  | 3.47±0.03 | 7 |  |  |  |  |
| 3.40±0.03 | 5 |  |  |  |  |  |  |
|  |  | 3.36±0.10 | 0–8 |  |  |  |  |
| 3.35±0.10 | 0–8 | 3.35±0.03 | 5 |  |  |  |  |
|  |  |  |  |  |  | 3.338 | 18 |
|  |  |  |  | 3.328 | 12 |  |  |
|  |  |  |  |  |  | 3.253 | 1 |
|  |  |  |  | 3.241 | 3 |  |  |
| 3.23±0.03 | 6 |  |  |  |  |  |  |
|  |  | 3.22±0.03 | 4 |  |  |  |  |
|  |  | 3.18±0.03 | 4 |  |  |  |  |
|  |  | 3.15±0.03 | 4 |  |  |  |  |
| 3.10±0.03 | 0–1 |  |  |  |  |  |  |
|  |  |  |  |  |  | 3.051 | 4 |
|  |  |  |  | 3.041 | 4 |  |  |
|  |  | 2.99±0.03 | 0–1 |  |  |  |  |
|  |  | 2.98±0.03 | 4 |  |  |  |  |
|  |  |  |  |  |  | 2.941 | 9 |
|  |  |  |  | 2.934 | 8 |  |  |
| 2.90±0.03 | 3 |  |  |  |  |  |  |
|  |  | 2.89±0.03 | 4 |  |  |  |  |
|  |  |  |  |  |  | 2.885 | 19 |
|  |  |  |  | 2.875 | 6 |  |  |
| 2.85±0.03 | 0–2 | 2.85±0.03 | 0–2 |  |  |  |  |
|  |  | 2.81±0.03 | 3 |  |  |  |  |
|  |  |  |  |  |  | 2.794 | 8 |
|  |  |  |  | 2.783 | 7 |  |  |
|  |  |  |  |  |  | 2.743 | 2 |
|  |  | 2.74±0.03 | 1 |  |  |  |  |
|  |  |  |  | 2.732 | 4 |  |  |
| 2.71±0.03 | 1 |  |  |  |  |  |  |
|  |  |  |  |  |  | 2.663 | 8 |
|  |  |  |  | 2.653 | 6 |  |  |
|  |  |  |  |  |  | 2.620 | 3 |
|  |  |  |  | 2.610 | 4 |  |  |
| 2.58±0.03 | 1 |  |  |  |  |  |  |
|  |  |  |  |  |  | 2.550 | 1 |
| 2.53±0.03 | 2 | 2.53±0.02 | 2 |  |  |  |  |
| 2.49±0.03 | 0–4 | 2.49±0.03 | 0–4 |  |  |  |  |
| 2.47±0.03 | 0–3 | 2.47±0.03 | 0–3 |  |  |  |  |
|  |  | 2.46±0.02 | 2 |  |  |  |  |
| 2.45±0.03 | 0–2 | 2.45±0.02 | 0–2 |  |  |  |  |
|  |  |  |  | 2.440 | 1 |  |  |
|  |  |  |  |  |  | 2.404 | 5 |
|  |  |  |  | 2.396 | 5 |  |  |
|  |  |  |  |  |  | 2.254 | 1 |
|  |  |  |  |  |  | 2.209 | 3 |
|  |  |  |  | 2.202 | 3 |  |  |
|  |  |  |  |  |  | 2.182 | 3 |
|  |  |  |  | 2.175 | 2 |  |  |
|  |  |  |  |  |  | 2.141 | 2 |
|  |  |  |  | 2.139 | 3 |  |  |
|  |  |  |  |  |  | 2.120 | 2 |
|  |  |  |  | 2.112 | 2 |  |  |
|  |  |  |  |  |  | 2.083 | 1 |
|  |  |  |  | 2.074 | 1 |  |  |
| 2.04±0.03 | 2 | 2.02±0.02 | 0.5 |  |  |  |  |
|  |  |  |  | 2.000 | 1 |  |  |
| 1.96±0.03 | 1 |  |  |  |  |  |  |
|  |  |  |  |  |  | 1.952 | 1 |
|  |  | 1.95±0.02 | 0.05 |  |  |  |  |
|  |  |  |  | 1.945 | 1 |  |  |
|  |  |  |  |  |  | 1.928 | 1 |
|  |  |  |  | 1.921 | 1 |  |  |
| 1.88±0.02 | 1 |  |  |  |  |  |  |
|  |  | 1.87±0.02 | 0.5 |  |  |  |  |
|  |  |  |  | 1.859 | 1 |  |  |
|  |  |  |  |  |  | 1.842 | 1 |
|  |  |  |  | 1.821 | 1 |  |  |
| 1.82±0.02 | 1 |  |  |  |  |  |  |
| 1.81±0.02 | 0–2 | 1.81±0.02 | 0–2 |  |  |  |  |
| 1.79±0.02 | 1 |  |  |  |  |  |  |
|  |  |  |  |  |  | 1.789 | 1 |
|  |  |  |  | 1.784 | 1 |  |  |
|  |  |  |  |  |  | 1.767 | 2 |
|  |  |  |  | 1.761 | 2 |  |  |
|  |  |  |  |  |  | 1.721 | 3 |
|  |  | 1.72±0.02 | 0.5 |  |  |  |  |
|  |  |  |  | 1.714 | 2 |  |  |
|  |  |  |  |  |  | 1.602 | 3 |
|  |  |  |  | 1.597 | 3 |  |  |
| 1.53±0.02 | 1 |  |  |  |  |  |  | iii. Third difference relates to that in the adsorbing capacity of gases of various kinds.

In the comparison of the adsorbing capacity for gases of various kinds, as $N_2$, $O_2$, CO, $CO_2$, $CH_4$, $C_2H_4$, $C_3H_8$ and $C_2H_2$ of adsorbents of the present invention with those of the reference in the treatment carried out at a room temperature (20°C. in the case of the present invention and 25°C. in the case of the reference) under a normal pressure (760 mm.Hg. in the case of the present invention and 160 to 750 mm.Hg. in the case of the reference), it is evidently seen from the Table D that the adsorbents of the present invention have evidently stronger adsorbing capacity for $N_2$, but far weaker for CO and $CO_2$ than that of the reference. Thus, it is concluded that the adsorbents of the present invention have the adsorbing order for various gases different from that of the reference.

TABLE D

Difference in the adsorbing capacity

|  | Present invention | | | | Reference | |
|---|---|---|---|---|---|---|
|  | Adsorbent A at 20°C. under 760 mm.Hg | | Adsorbent B at 20°C. under 760 mm.Hg | | $Na_2X$ zeolite of Milton at 25°C. under 160–750 mm.Hg | |
|  | Conversion | | Conversion | | | |
|  | cc. | in g. | cc. | in g. | g. | mm.Hg |
| $N_2$ | 19.0 | 2.22 | 11.6 | 1.37 | <1 | 500 |
| $O_2$ | 7.78 | 1.04 | 5.0 | 0.67 | <1 | 500 |
| CO | 30.4 | 3.55 | 16.2 | 1.89 | 5.1 | 750 |
| $CO_2$ | 71.7 | 13.15 | 45.0 | 8.25 | 26.3 | 750 |
| $CH_4$ | 17.8 | 1.19 | 13.3 | 0.89 | <1 | 500 |
| $C_2H_4$ | 34.1 | 3.98 | 34.1 | 3.98 | 10.1 | 160 |
| $C_3H_8$ | 9.2 | 1.69 | | | 14.6 | 700 |
| $C_2H_2$ | | | 40.2 | 4.36 | 14.7 | 740 | iv. Fourth difference relates to that in the resistance against acid. The adsorbents of the present invention are characterized by a high resistance against acid as compared with those of the reference, for instance, when zeolite X of the reference was mixed with water and 2 milliliters of concentrated hydrochloric acid and then heated, it becomes gel, as is disclosed in the specification of U.S. Pat. No. 2,882,244, while the adsorbents of the present invention remain unchanged even when they are boiled in a 2N solution of such acid as $H_2SO_4$, HCl and $HNO_3$ of a temperature of 100°C. for 50 hours.

This difference in the resistance against acid demonstrates that both adsorbents are different from each other.

From above-mentioned four main differences between the adsorbents of the present invention and those of the reference it can be concluded that the present invention is based on adsorbents novel over the prior art.

Further, it is to note that the adsorbents of the present invention are particularly technically advantageous that they exhibit the most effective adsorbing capacity at a normal temperature under the normal pressure.

The results of the experiments made on the adsorbing capacities of adsorbents A and B at various temperature are shown as follows:

Amount of gases adsorbed by adsorbent A (gas cc./g.-adsorbent)

|  | 20°C. | 100°C. | 200°C. |
|---|---|---|---|
| $N_2$ | 19.0 | 3.5 | |
| $O_2$ | 7.78 | 0 | |
| CO | 30.4 | 2.5 | |
| $CO_2$ | 71.7 | | 0 |
| $CH_4$ | 17.8 | | |
| $C_2H_4$ | 34.1 | 19.0 | |
| $C_3H_8$ | 9.2 | | |

Amount of gases adsorbed by adsorbent B (gas cc./g.-adsorbent)

|  | 20°C | 100°C. |
|---|---|---|
| $O_2$ | 5.0 | 0.8 |
| $N_2$ | 11.6 | 1.7 |
| CO | 16.2 | |
| $CO_2$ | 45.0 | |
| $CH_4$ | 13.3 | |
| $C_2H_4$ | 34.1 | |
| $C_2H_2$ | 40.2 | |

Further, the adsorbents of the present invention are economically very advantageous, because they can be prepared by shattering naturally occurred rocks to pieces or powder and heating them for 3 hours to from 350° to 700°C. to activate the same thereby.

Thus, the separation of gas mixtures by using the adsorbents of this invention is very interesting industrially, that is, by using the adsorbents which have a strong adsorption power and which can be obtained by a comparatively simple treatment of a naturally occurring rock which is very different from the case of obtaining known activated carbon, synthetic zeolite and silica gel.

The features of the present invention are as follows: That is, the adsorbent used in this invention is prepared from the inorganic material having the aforesaid chemical composition and defined by the above-mentioned X-ray diffraction image. The rock is activated by heating it to a temperature of 350° to 700°C., preferably 400° to 650°C., which is higher than the treating temperature of known molecular sieves. The adsorption power thereof for $N_2$ is larger than those of conventional adsorbents and in particular that of adsorbent A of this invention is twice as large as those of the known adsorbents. The adsorption power of the adsorbent of this invention for CO is also large.

Such an adsorbent having an extremely large adsorption power can be obtained comparatively simply and with a low cost. Therefore, the feature of this invention is in the point of conducting the separation and the concentration of a gas mixture using such an excellent adsorbent.

The following examples illustrate the case of separating or concentrating various gases from various gas mixture by the process of this invention.

EXAMPLE 1

The above-mentioned rock A was ground into 16–32 mesh size and dehydrated by heating it for 3 hours to 600°C. By using thus obtained adsorbent, the separation of oxygen and nitrogen from air was conducted in a continuous moving bed type layer in which the adsorption step was conducted at 20°C. and the desorption was at 120°C. By the separation procedure, 42 cubic meters of $O_2$ of 50 percent in purity (containing Ar) and 58 cubic meters of nitrogen of 99.9 percent in purity were obtained from 100 cubic meters of air.

EXAMPLE 2

The above-mentioned rock B was ground into 16–32 mesh size and dehydrated by heating it for 3 hours to 600°C. By using thus obtained adsorbent, the procedure same as Example 1 was repeated and 31 cubic meters of $O_2$ of 67.7 percent in purity (containing Ar) and 69 cubic meters of $N_2$ of 99.9 percent in purity were obtained from 100 cubic meters of air.

The invention has been explained about the preferred embodiments of this invention but it should be understood that the kind of gases to be separated, the kind of adsorbent and the manner of activation process for the adsorbent may be changed.

Other embodiments of the present invention will be explained as follows:

Separation of carbon monoxide:

A gas mixture containing about 80 percent of CO, about 15 percent of $CO_2$, and about 5 percent of $N_2$ is treated with an alkali to separate $CO_2$ therefrom and then the concentration of CO in the gas mixture can be increased by utilizing the difference of the adsorbent of this invention in adsorption powers to CO and $N_2$. A similar procedure is applicable to a gas mixture recovered from a steel-making electric furnace or a converter. Further, the process may be applied to remove CO from various waste gases such as a waste gas from automobiles.

Separation of ammonia:

The adsorbent of this invention can be used for the separation or concentration of ammonia in a gas mixture. For example, from an $NH_3$-decomposition gas containing $NH_3$, $N_2$ and $H_2$, each gas can be separated by utilizing the difference of the adsorbent in adsorption power for $NH_3 > N_2 > H_2$.

For example, adsorbent A obtained from rock A of Fukushima Prefecture adsorbs about 15 percent based on the weight of the adsorbent of $NH_3$ and adsorbent A obtained from rock A of Akita Prefecture adsorbs about 9 percent of $NH_3$. Further adsorbent B obtained from rock B of Yamagata Prefecture adsorbs about 6 percent of $NH_3$.

Purification of hydrogen:

Adsorbent A and adsorbent B of this invention have been explained about the adsorption powers to various gases but the important feature of the adsorbent of this invention is that the adsorption power thereof for hydrogen is almost zero at normal temperature.

By utilizing this fact, hydrogen can be separated or purified in an $NH_3$-decomposition gas, a part of a circulating gas for an ammonia synthesis plant or methanol synthesis plant, which is purged for preventing the accumulation of materials unnecessary for the reaction, a reducing gas obtained by cracking hydrocarbons, and a coke-oven gas.

Dehumidification and drying of gases:

The adsorbent of this invention can be used for the dehumidification and drying of a single gas such as hydrogen or a gas mixture such as air.

In the case of activating by heating the naturally occurring inorganic material for obtaining the adsorbent, usually 10–15 percent of water is removed. Thus treated adsorbent has a very strong property as a dehumidifying and drying agent. That is, the adsorbent adsorbs water in a gas until it adsorbs about 60-80 percent based on the amount of originally contained water in the rock.

This amount of water adsorbed on the adsorbent is considerably large but it is lower than silica gel. However, the adsorbent of this invention is better than silica gel in the point of drying extent of a gas which is dried by the adsorbent. That is, usually a gas can be dried to an extent of −50° to −60°C. in dew point.

What is claimed is:

1. A process for selectively separating CO from a gas mixture of CO and $N_2$ which comprises contacting an adsorbent with said gas mixture at room temperature and normal pressure to adsorb CO therefrom and heating said absorbent to effect desorption of said CO, said adsorbent being prepared by heating a naturally-occurring rock at a temperature of 350° to 700°C to activate the same, said rock having a chemical composition consisting essentially of $SiO_2$, $Al_2O_3$, and $H_2O$ and containing 1 to 10 percent by weight of the total of $K_2O$, $Na_2O$ and CaO and also having an X-ray diffraction image selected from the group consisting of those shown in Table A and Table B of the specification.

2. A process for selectively separating $NH_3$ from a gas mixture of $NH_3$, $N_2$ and $H_2$ which comprises contacting an adsorbent with said gas mixture at room temperature and normal pressure to adsorb $NH_3$ therefrom, and heating said adsorbent to effect desorption of $NH_3$ therefrom, said adsorbent being prepared by heating a naturally-occurring rock at a temperature of 350° to 700°C to activate the same, said rock having a chemical composition consisting essentially of $SiO_2$, $Al_2O_3$ and $H_2O$ and containing 1 to 10 percent by weight of the total of $K_2O$, $Na_2O$ and CaO and also having an X-ray diffraction image selected from the group consisting of those shown in Table A and Table B of the specification.

3. A process for selectively adsorbing water from air or hydrogen containing water which comprises contacting an adsorbent with air or moist hydrogen at room temperature and normal pressure to adsorb water therefrom and then heating said adsorbent to effect desorption of said water, said adsorbent being prepared by heating a naturally-occurring rock at a temperature of 350° to 700°C to activate the same, said rock having a chemical composition consisting essentially of $SiO_2$, $Al_2O_3$ and $H_2O$ and containing 1 to 10 percent by weight of the total of $K_2O$, $Na_2O$ and CaO and also having an X-ray diffraction image selected from the group consisting of those shown in Table A and Table B of the specification.

* * * * *